(12) United States Patent
Xue et al.

(10) Patent No.: US 12,479,154 B2
(45) Date of Patent: Nov. 25, 2025

(54) ULTRA-THIN FLEXIBLE VAPOR CHAMBER AND PREPARATION METHOD AND APPLICATION THEREOF

(71) Applicant: PEKING UNIVERSITY NANCHANG INNOVATION INSTITUTE, Jiangxi (CN)

(72) Inventors: Yahui Xue, Jiangxi (CN); Jie Gao, Jiangxi (CN); Jinchao Zhang, Jiangxi (CN); Ming Guo, Jiangxi (CN); Kuan Zong, Jiangxi (CN); Debao Liu, Jiangxi (CN)

(73) Assignee: PEKING UNIVERSITY NANCHANG INNOVATION INSTITUTE, Jiangxi (CN)

( * ) Notice: Subject to any disclaimer, the term of this patent is extended or adjusted under 35 U.S.C. 154(b) by 0 days.

(21) Appl. No.: 19/034,743

(22) Filed: Jan. 23, 2025

(65) Prior Publication Data

US 2025/0249637 A1    Aug. 7, 2025

(30) Foreign Application Priority Data

Feb. 6, 2024   (CN) .................... 202410169984.X (51) Int. Cl.
*B29C 64/124* (2017.01)
*B29C 64/30* (2017.01)
(Continued)

(52) U.S. Cl.
CPC ............ *B29C 64/124* (2017.08); *B29C 64/30* (2017.08); *B33Y 10/00* (2014.12); *B33Y 40/20* (2020.01); *B33Y 80/00* (2014.12)

(58) Field of Classification Search
CPC .... F28C 3/06; F28C 3/08; F28D 15/02; F28D 2015/0216; F28D 15/0233; F28D 15/0241;
(Continued)

(56) References Cited

U.S. PATENT DOCUMENTS

| | | | |
|---|---|---|---|
| 2010/0132930 A1* | 6/2010 | Izenson | ..................... F28F 3/12 165/173 |
| 2016/0069622 A1* | 3/2016 | Alexiou | ................. B23P 15/26 219/76.1 |

(Continued)

FOREIGN PATENT DOCUMENTS

| CN | 113606972 A | 11/2021 |
|---|---|---|
| CN | 114485237 A | 5/2022 |

(Continued)

*Primary Examiner* — Andrew L Swanson
(74) *Attorney, Agent, or Firm* — Rondaus PLLC; George Liu (57) ABSTRACT

An ultra-thin flexible vapor chamber and a preparation method and application thereof are provided. Based on projection micro stereolithography technology, the preparation method of the present disclosure enables preparation of the ultra-thin flexible vapor chamber of a micro-scale and high-precision ultra-thin dot matrix array structure with excellent liquid absorption and support capabilities. To improve properties of the vapor chamber, various dot matrix array structures including but not limited to a star-shaped array structure, a radial array structure and a parallel array structure, can be designed by topologically optimizing a distribution of the dot matrix array structure according to a location of a heat source. The ultra-thin flexible vapor chamber prepared herein not only meets requirements of an electronic device for a vapor chamber thickness and weight, but also features flexibility and bendability, stronger thermal conductivity, less thermal resistance and less energy consumption.

4 Claims, 5 Drawing Sheets

(51) Int. Cl.
*B33Y 10/00* (2015.01)
*B33Y 40/20* (2020.01)
*B33Y 80/00* (2015.01)

(58) Field of Classification Search
CPC .... F28D 15/0283; F28D 15/04; F28D 15/043;
F28D 15/046; B29C 64/124; B29C 64/30;
B33Y 10/00; B33Y 40/20; B33Y 80/00;
B23P 15/26
See application file for complete search history.

(56) References Cited

U.S. PATENT DOCUMENTS

2017/0049008 A1* 2/2017 Pascall .................. C25D 15/00
2020/0064080 A1* 2/2020 Huang ................ F28D 15/0233
2022/0339858 A1 10/2022 Heidari et al.
2024/0418459 A1* 12/2024 Huang ................... B22F 10/20

FOREIGN PATENT DOCUMENTS

| CN | 114993083 A | 9/2022 | |
| CN | 117445401 A | 1/2024 | |
| WO | WO-2020041320 A1 * | 2/2020 | ........... H01L 23/552 |

* cited by examiner

ULTRA-THIN FLEXIBLE VAPOR CHAMBER AND PREPARATION METHOD AND APPLICATION THEREOF

CROSS-REFERENCE TO RELATED APPLICATIONS

This application claims priority to Chinese Patent Application No. 202410169984.X, filed on Feb. 6, 2024, which is incorporated herein by reference in its entirety.

TECHNICAL FIELD

The present disclosure relates to the technical field of vapor chambers, and in particular to an ultra-thin flexible vapor chamber and a preparation method and application thereof.

BACKGROUND

In recent years, improvements in properties of core components of electronic devices, and increasing miniaturization and thinness of electronic devices, have resulted in a sharp decrease in heat dissipation space thereof, and an exponential increase in a heat flux density. Meanwhile, heat dissipation defects of electronic devices become increasingly prominent. As an ideal choice to overcome such defects, vapor chambers based on phase-change heat dissipation technology have been applied in thin and light electronic devices.

On the other hand, advancement and application of foldable and flexible screen technologies, have promoted popularity of wearable electronic devices such as foldable mobile phones, curved screen bracelets and head-mounted VR devices, which has become a trend in development of microelectronic devices. Flexible vapor chambers feature excellent heating properties, large-area thermal uniformity and excellent thermal stability, and have advantages in many fields. The flexible vapor chambers can be used in electronic products, and are capable of effectively overcoming the heat dissipation defects of electronic devices and improving properties and stability thereof.

Capillary wick structures of currently available flexible vapor chambers are usually made of flexible porous materials such as porous plastics, porous polymers, foam metals, and multi-layer woven wire meshes. However, the capillary wick structures and flexible vapor chambers prepared by this method are not only thick and heavy, but also have low thermal conductivity, high thermal resistance and high energy consumption, thereby shortening the service life of electronic devices and making user experience thereof poor.

SUMMARY

To solve the problems existing in the background art, the present disclosure provides an ultra-thin flexible vapor chamber and a preparation method and application thereof. Based on projection micro stereolithography (PµSL) technology, the preparation method of the present disclosure enables a design of a micro-scale and high-precision ultra-thin dot matrix array structure. The ultra-thin flexible vapor chamber prepared herein not only meets requirements of an electronic device for a vapor chamber thickness and weight, but also features flexibility and bendability, stronger thermal conductivity, less thermal resistance and less energy consumption, thereby reducing power consumption and prolonging a service life of the electronic device.

In a first aspect, the present disclosure provides a preparation method for an ultra-thin flexible vapor chamber, and the method includes: preparing a lower cover plate and an upper cover plate; printing a dot matrix array structure on one side of the lower cover plate using a PµSL device; performing surface treatment on the dot matrix array structure; sealing the upper cover plate for a first time on one side of the lower cover plate with the dot matrix array structure; degassing and injecting liquid for the upper cover plate and the lower cover plates after the sealing for the first time; and sealing the upper cover plate and the lower cover plate for a second time to obtain the ultra-thin flexible vapor chamber.

The dot matrix array structure has capillary suction properties and strength characteristics, and plays a key role in absorbing and transporting liquid and providing support for the vapor chamber.

The dot matrix array structure includes but is not limited to a parallel array structure, a star-shaped array structure and a radial array structure. By topologically optimizing a distribution of the dot matrix array structure according to a location of a heat source, various dot matrix array structures such as the parallel array structure, the star-shaped array structure and the radial array structure can be designed, which can effectively improve the properties of the vapor chamber.

In some embodiments of the present disclosure, a precision of the PµSL device is 2-10 µm.

In some embodiments of the present disclosure, the surface treatment of the dot matrix array structure includes chemical plating and oxidizing treatment in sequence; or
the surface treatment of the dot matrix array structure includes chemical plating, electroplating and oxidizing treatment in sequence.

In some embodiments of the present disclosure, the oxidizing treatment is performed by using hydrogen peroxide; and a concentration of the hydrogen peroxide is 20 wt %-30 wt %.

In some embodiments of the present disclosure, the sealing for the first time includes the following steps: cutting a hot melt film into a rectangular-ambulatory-plane frame; placing the hot melt film of the rectangular-ambulatory-plane frame around an overlapping area between the upper cover plate and the lower cover plate; placing the elongated hot melt film and a liquid injection tube near a tail portion of the dot matrix array structure; and sealing the overlapping area of the upper cover plate and the lower cover plate by heating and pressurizing.

In some embodiments of the present disclosure, the degassing and injecting liquid for the liquid injection tube.

In some embodiments of the present disclosure, the sealing for the second time includes the following step: sealing the hot melt film placed near the tail portion of the dot matrix array structure, using a heat sealer, by heating and pressurizing.

In some embodiments of the present disclosure, the upper cover plate and the lower cover plate independently use one of an FPCB, a copper foil, a graphene-coated copper plate, graphene, and a metal-polymer composite material.

In a second aspect, the present disclosure provides an ultra-thin flexible vapor chamber prepared through the above preparation method for an ultra-thin flexible vapor chamber.

In a third aspect, the present disclosure provides an ultra-thin flexible vapor chamber prepared through the above preparation method for an ultra-thin flexible vapor chamber or an application of the above ultra-thin flexible vapor chamber in heat dissipation of an electronic device.

Compared with the prior art, the present disclosure has the following beneficial effects:
1. Based on micro-scale PμSL technology, the present disclosure, compared with a method for preparing a dot matrix array structure through use of a flexible porous material, is capable of preparing an ultra-thin flexible vapor chamber, and the ultra-thin flexible vapor chamber is not only used for heat dissipation of a flexible electronic device, but also meets needs of any other device that requires uniform heat dissipation.
2. The present disclosure employs flexible substrates such as the FPCB, graphene, a thin copper foil, and the like, and has the advantages of being lightweight and cost-effective with a large surface area, as well as scalability for mass preparation.
3. The ultra-thin flexible vapor chamber of the present disclosure can be customized based on a shape and space of an electronic device, occupies minimal space, and makes the electronic device more compact, which is lighter and thinner than a traditional heat dissipation device, thereby reducing an overall weight of the electronic device and improving portability.
4. The ultra-thin flexible vapor chamber of the present disclosure features stronger thermal conductivity, and less thermal resistance and less energy consumption, thereby reducing power consumption and prolonging a service life of the electronic device.

BRIEF DESCRIPTION OF THE DRAWINGS

Other advantages and benefits of the present disclosure will be apparent to a person of ordinary skill in the art from reading the detailed description of preferred embodiments below. The accompanying drawings are only for the purpose of showing the preferred embodiments and should not be considered as limiting of the present disclosure. Same reference signs indicate the same components throughout the accompanying drawings. Reference numerals in the figures.

DETAILED DESCRIPTIONS OF THE EMBODIMENTS

It should be made clear that the embodiments described are merely some rather than all of the embodiments of the present disclosure. Based on the examples of the present disclosure, all other examples acquired by those of ordinary skill in the art without making creative efforts fall within the scope of protection of the present disclosure.
When the following description refers to the accompanying drawings, unless otherwise indicated, the same numbers in different drawings indicate the same or similar elements.

The embodiments described in the following exemplary examples do not represent all embodiments consistent with the present disclosure. Rather, they are merely examples of devices and methods consistent with some aspects of the present disclosure as detailed in the appended claims.
In the description of the present disclosure, it should be noted that the terms "first" and "second" are for descriptive purposes only and should not be construed as indicating or implying relative importance. For those of ordinary skill in the art, the specific meanings of the above terms in the present disclosure may be understood according to specific circumstances. In the description of the present disclosure, "a plurality of" means two or more, unless otherwise specified. The term "and/or", which is an association relation describing an associated object, means that there may be three relations, for example, A and/or B may represent three situations: A exists alone, A and B exist at the same time, and B exists alone. The character "/" generally indicates that successive association objects are in an "or" relation.
Flexible vapor chambers can be used to effectively overcome heat dissipation defects of electronic devices such as foldable mobile phones, curved screen bracelets and head-mounted VR devices, thereby improving product properties and stability. However, capillary wick structures of currently available flexible vapor chambers are usually made of flexible porous materials such as porous plastics, porous polymers, foam metals, and multi-layer woven wire meshes. The capillary wick structures and flexible vapor chambers prepared by this method are not only thick and heavy, but also have low thermal conductivity, high thermal resistance and high energy consumption, thereby shortening the service life of electronic devices and making user experience thereof poor.
Based on projection micro stereolithography (PμSL) technology, a preparation method of the present disclosure is used to prepare an ultra-thin flexible vapor chamber, and the PμSL technology is also used to print a dot matrix array structure. Compared with a method for preparing a dot matrix array structure through use of a flexible porous material, the present disclosure enables a design of a micro-scale and high-precision ultra-thin dot matrix array structure.
Moreover, to improve the properties of the vapor chamber, various dot matrix array structures such as a star-shaped array structure, a radial array structure and a parallel array structure, can be designed by topologically optimizing a distribution of the dot matrix array structure according to a location of a heat source.
The ultra-thin flexible vapor chamber prepared herein not only meets requirements of an electronic device for a vapor chamber thickness and weight, but also features flexibility and bendability, stronger thermal conductivity, less thermal resistance and less energy consumption, thereby reducing power consumption and prolonging a service life of the electronic device.
The ultra-thin flexible vapor chamber of the present disclosure features excellent heating properties, large-area thermal uniformity and excellent thermal stability, and has advantages in many fields. The ultra-thin flexible vapor chambers are capable of effectively overcoming the heat dissipation defects of electronic devices and improving properties and stability thereof. The ultra-thin flexible vapor chamber of the present disclosure has significant potential in thermal management applications.
When the ultra-thin flexible vapor chamber of the present disclosure is used in an electronic device such as a smartphone, a tablet PC or a laptop, the electronic device can be thinned with a service life prolonged; the ultra-thin flexible vapor chamber can be applied to a data center, which is capable of improving heat dissipation efficiency of a server, reducing energy consumption thereof, and contributing to green energy saving; the ultra-thin flexible vapor chamber can be applied to the field of new energy electric vehicles, which can be used for heat dissipation of an electric vehicle battery pack to prolong battery life and enhance safety thereof; and the ultra-thin flexible vapor chamber can be applied to the fields of medical care, aerospace and the like, and helps to improve heat transfer/heat dissipation properties of devices.

In a first aspect, the present disclosure provides a preparation method for an ultra-thin flexible vapor chamber.

Figure 1:
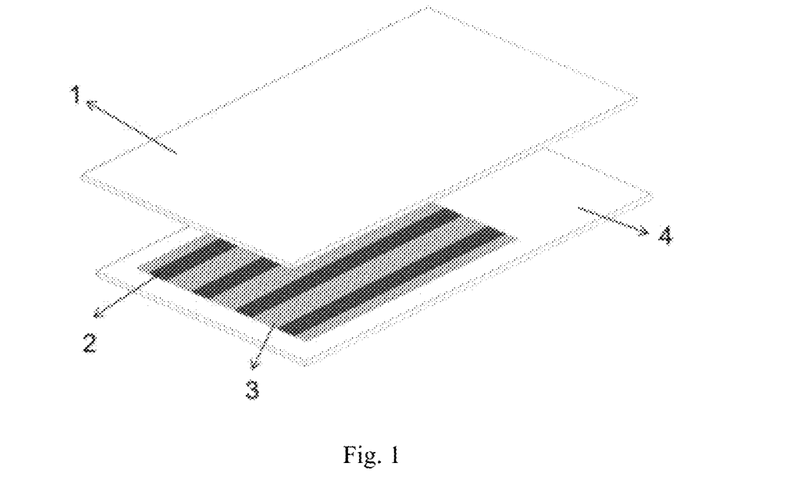
FIG. 1 is an exploded view of an ultra-thin flexible vapor chamber of the present disclosure.
Figure 2:
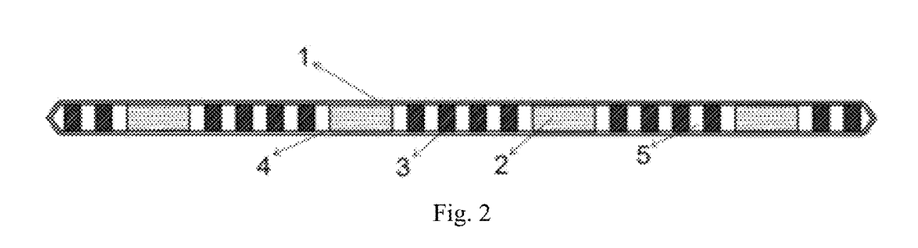
FIG. 2 is a sectional view of an ultra-thin flexible vapor chamber of the present disclosure.
Figure 3:
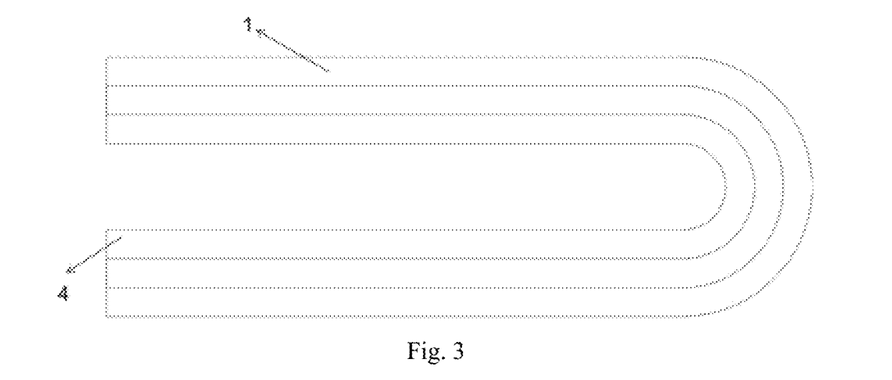
FIG. 3 is a schematic diagram of bending of an ultra-thin flexible vapor chamber of the present disclosure.

As illustrated in FIGS. 1-3, the ultra-thin flexible vapor chamber includes an upper cover plate 1, a dot matrix array structure, a lower cover plate 4 and a cavity 5, where the dot matrix array structure and the cavity 5 are both arranged between the upper cover plate 1 and the lower cover plate 4.

Specifically, the dot matrix array structure in this example is formed by a structural unit array.

Figure 4:
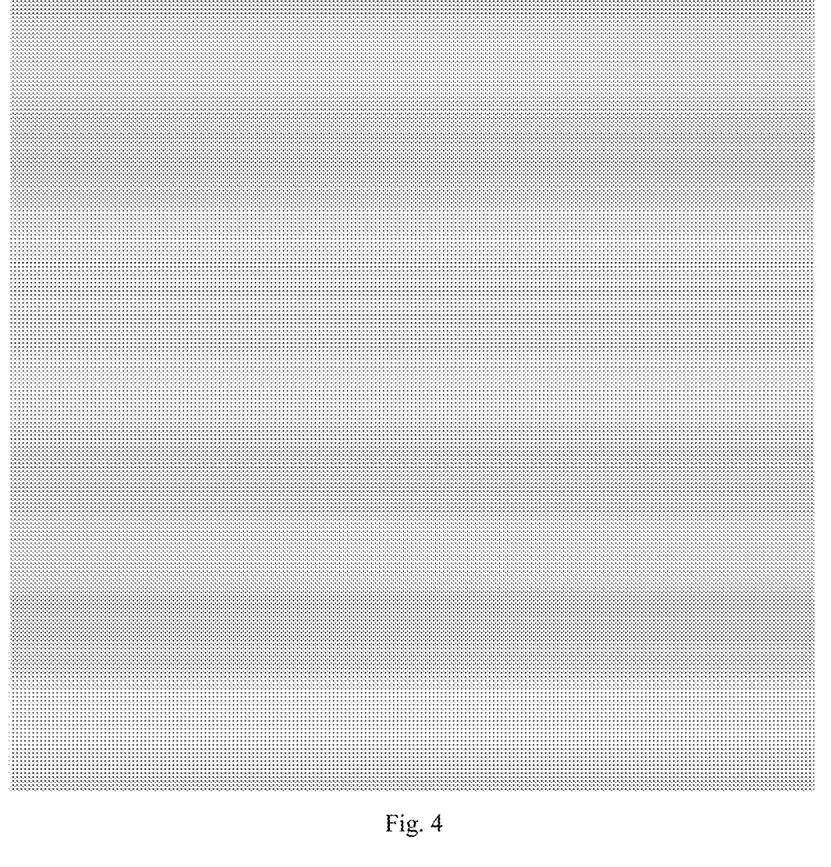
FIG. 4 is a schematic diagram of a parallel dot matrix array structure.

In some examples of the present disclosure, as illustrated in FIG. 4, the dot matrix array structure can be the parallel array structure.

It can be understood that the parallel array structure refers to a structure formed by dividing a surface of the lower cover plate 4 into a plurality of mutually parallel long-strip rectangular areas, and arranging the structural units in long-strip rectangular area according to a designed specification and spacing.

Specifically, in this example, as illustrated in FIG. 1 and FIG. 2, the parallel array structure includes a dot matrix array structure a 2 and a dot matrix array structure b 3.

Figure 5:
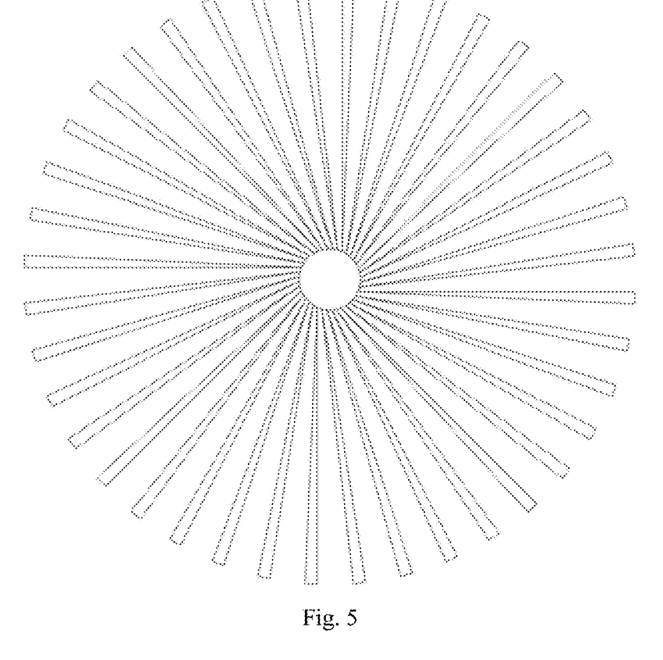
FIG. 5 is a schematic diagram of a star-shaped dot matrix array structure.
Figure 6:
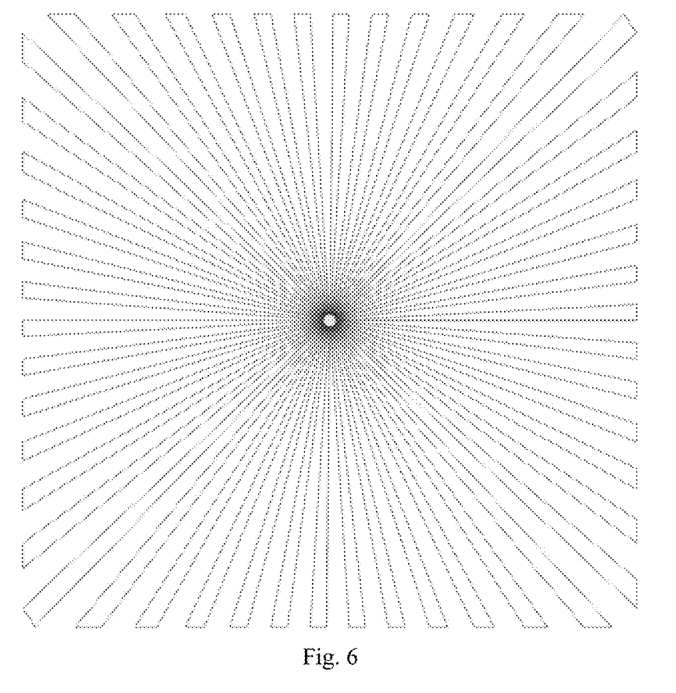
FIG. 6 is a schematic diagram of another star-shaped dot matrix array structure.

In some other examples of the present disclosure, as illustrated in FIG. 5 and FIG. 6, the dot matrix array structure can also be the star-shaped array structure.

Figure 7:
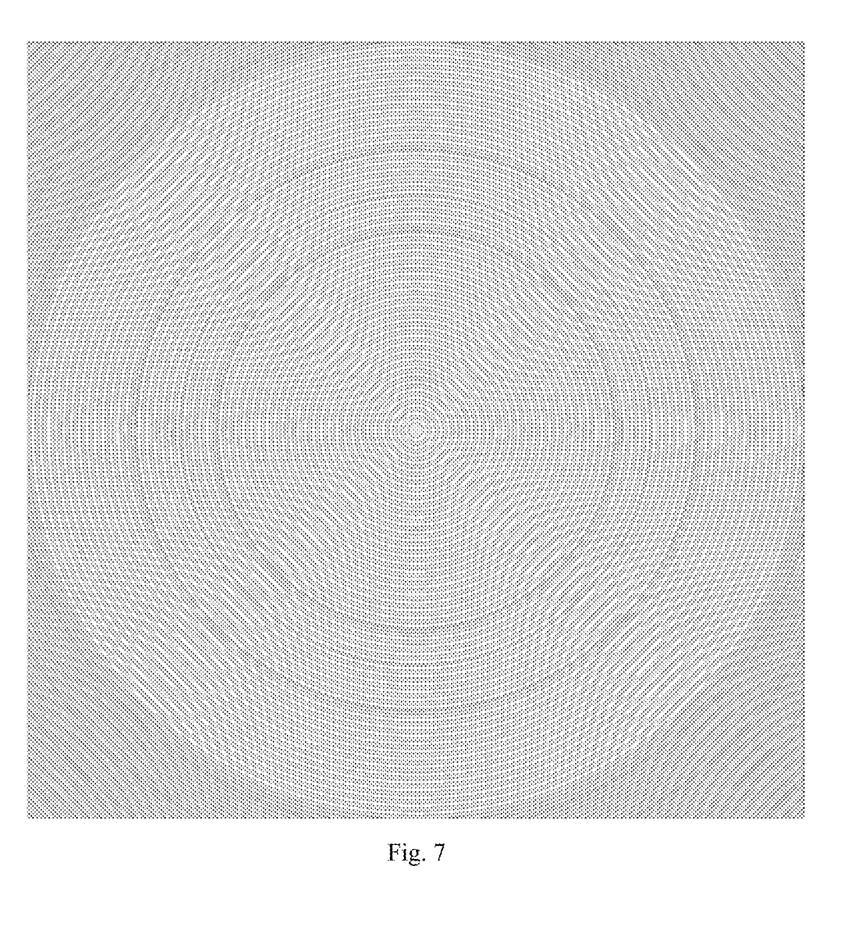
FIG. 7 is a schematic diagram of a radial dot matrix array structure.

In some other examples of the present disclosure, as illustrated in FIG. 7, the dot matrix array structure can also be the radial array structure.

The preparation method for an ultra-thin flexible vapor chamber in the present disclosure includes the following steps.

1) Prepare a Lower Cover and an Upper Cover.

In an example of the present disclosure, both the upper cover plate 1 and the lower cover plate 4 are made of a substrate material with excellent flexibility and thermal conductivity.

In some examples of the present disclosure, the upper cover plate 1 and the lower cover plate 4 independently use one of a flexible printed circuit board, a copper foil, a graphene-coated copper plate, graphene, and a metal-polymer composite material.

The metal-polymer composite material includes but is not limited to a copper-polyimide composite material.

The lower cover plate 4 and the upper cover plate 1 made of one of the flexible printed circuit board, the copper foil, the graphene-coated copper plate, the graphene, and the metal-polymer composite material, have excellent flexibility and thermal conductivity.

Further, the upper cover plate 1 and the lower cover plate 4 can be independently 0.03 mm-1 mm thick.

It should be understood that, in some examples of the present disclosure, the upper cover plate 1 and the lower cover plate 4 can be thick separately within a range from 0.03 mm-1 mm, i.e., any thickness within the range is optional.

2) Print a Dot Matrix Array Structure on One Side of the Lower Cover Plate Through a PµSL Device.

In an example of the present disclosure, first design a three-dimensional model diagram of the desired dot matrix array structure, slice the three-dimensional model diagram layer by layer through slicing software, extract contours generated by each layer of slicing, design a reasonable scanning path, and then convert same into a corresponding digital control program and import same into the PµSL device.

Then prepare a printing material of the dot matrix array structure and load same into the PµSL device, where a Z axis of the PµSL device is dual-axis, select various model parameters of the printed dot matrix array structure a 2 and the dot matrix array structure b 3 through control software, and adjust a temperature of the PµSL device to 25° C., with printing speeds of 10 mm/s in X-axis and Y-axis directions, 0.5 mm/s and 1 mm/s in Z1-axis and Z2-axis directions respectively.

Then, start printing, print the dot matrix array structure a 2 and the dot matrix array structure b 3 layer by layer on the lower cover plate 4 according to the scanning path until the dot matrix array structure a 2 and the dot matrix array structure b 3 are fully printed, and remove the lower cover plate 4 together with the dot matrix array structure a 2 and the dot matrix array structure b 3 from the PµSL device.

In an example of the present disclosure, the printing material includes but is not limited to a resin material.

In an example of the present disclosure, the PµSL device includes but is not limited to a photocurable PµSL device, to realize micro-scale PµSL and a high-precision design of the ultra-thin dot matrix array structure a 2 and the dot matrix array structure b 3.

In some examples of the present disclosure, the PµSL device is an ultra-high-precision photocurable PµSL device; and further, a precision of the photocurable PµSL device is 2-10 µm.

The photocurable PµSL device uses light beams to irradiate the materials of the dot matrix array structure a 2 and the dot matrix array structure b 3 to be printed layer by layer, and solidifies a liquid material layer by layer. In this way, the dot matrix array structure a 2 and the dot matrix array structure b 3 that are structurally complex and miniaturized can be fully printed to finally obtain the dot matrix array structure a 2 and the dot matrix array structure b 3, where the dot matrix array structure a 2 and the dot matrix array structure b 3 have high quality and high precision.

It should be understood that in some examples of the present disclosure, the photocurable PµSL device can have a precision of 2-10 µm.

In an example of the present disclosure, the dot matrix array structure a 2 and the dot matrix array structure b 3 are formed by the structural unit array, and are subjected to integrated PµSL on the lower cover plate 4.

Further, the dot matrix array structure a 2 and the dot matrix array structure b 3 are obtained by arraying different numbers of structural units with a size of 400-500 µm (length)*400-500 µm (width)*100-140 µm (height).

It should be understood that the structural units of the dot matrix array structure a 2 and the dot matrix array structure b 3 can be specifically designed to meet heat dissipation requirements for the ultra-thin flexible vapor chamber, and the sizes of the structural units include but are not limited to 400-500 µm (length)*400-500 µm (width)*100-140 µm (height), as well as relatively smaller or larger sizes. Any size is optional as long as the dot matrix array structures can be printed through the PµSL device, without limitation made herein.

To improve the properties of the vapor chamber, various dot matrix array structures including but not limited to the star-shaped array structure, the radial array structure and the parallel array structure, can be designed by topologically optimizing a distribution of the dot matrix array structure according to a location of a heat source.

3) Perform Surface Treatment on the Dot Matrix Array Structure.

In the example of the present disclosure, the surface treatment of the dot matrix array structure a 2 and the dot matrix array structure b 3 includes chemical plating and oxidizing treatment in sequence.

In some examples of the present disclosure, the chemical plating includes the steps of degreasing, roughening, sensitizing, activating, and chemical plating.

The dot matrix array structure a 2 and the dot matrix array structure b 3 of an array structure are obtained by using the PµSL technology. The dot matrix array structure a 2 and the dot matrix array structure b 3 are not hydrophilic because surface energy thereof is less than that of water. However, through a series of surface treatments such as chemical reduction and chemical copper plating to change the surface energy of the dot matrix array structure a 2 and the dot matrix array structure b 3 obtained through the PµSL in the lower cover plate 4, the dot matrix array structure a 2 and the dot matrix array structure b 3 become hydrophilic because the surface energy thereof is more than that of water.

Further, before the degreasing, water soaking treatment is performed to remove dust and other impurities on the surface of the lower cover plate 4. After each step of treatment, i.e., the degreasing, the roughening, the sensitizing, the activating, and the chemical plating, rinsing with sufficient water is performed to remove surface residues generated after the previous step of treatment, which is conducive to the next step of treatment.

The degreasing treatment is performed by using a degreasing agent, and degreasing time is 1 min-5 min.

The roughening treatment is performed by chemical roughening, and specifically a strong oxidizing agent can be used, with a roughening temperature of 55° C.-75° C. and roughening time of 1 min-5 min.

The sensitizing treatment is performed by using an acidic sensitizing solution, and the lower cover plate 4 is soaked in the acidic sensitizing solution for 2-5 min with slow shaking to make a layer of reducible $Sn^{2+}$ attached to the surface of the lower cover plate 4.

The activating treatment is performed by using an activating solution, the lower cover plate 4 is soaked in the activating solution at room temperature for 1.5-2.5 min to convert $Ag^+$ in the activating solution into metallic silver particles through a reducing action of $Sn^{2+}$, and the metallic silver particles are firmly attached to the surfaces of the dot matrix array structure a 2 and the dot matrix array structure b 3 to form a uniform catalytic crystallization center.

A chemical copper plating solution AB commonly used in industries is used for the chemical plating, and the lower cover plate 4 is placed in the chemical copper plating solution AB and magnetically stirred at a speed of 900-1100 r/min for 30 min-45 min, where a chemical plating solution AB is a mixture of copper sulfate and formaldehyde, and a chemical plating solution B is an alkaline complexing agent. In a water bath, the chemical copper plating solution is prepared by mixing the chemical plating solution A, the chemical plating solution B and deionized water in a ratio of 1:2:3 at 32° C.-45° C.

In some examples of the present disclosure, the oxidizing treatment is performed by using hydrogen peroxide; and further, a concentration of hydrogen peroxide is 20 wt %-30 wt %, and soaking time is 20 min-30 min.

The oxidizing treatment of the dot matrix array structure a 2 and the dot matrix array structure b 3 by using a hydrogen peroxide soaking method has the advantages of simple operation and high efficiency.

Further, the surfaces of the dot matrix array structure a 2 and the dot matrix array structure b 3 can be selectively electroplated after the chemical plating and before the oxidizing treatment.

It should be understood that necessity of electroplating optimization depends on requirements for material metallization of the dot matrix array structure a 2 and the dot matrix array structure b 3.

In some examples of the present disclosure, the electroplating treatment is performed by using a low-stress acidic electroplating solution, and a pulsed power supply is used for the electroplating to obtain a plating layer with a dense structure, a small grain size and good uniformity, thereby improving corrosion resistance, wear resistance, conductivity and other properties of the plating layer.

4) Seal the Upper Cover Plate for a First Time on One Side of the Lower Cover Plate with the Dot Matrix Array Structure a 2 and the Dot Matrix Array Structure b 3.

In an example of the present disclosure, the sealing for the first time specifically includes the following steps: cut a hot melt film into a rectangular-ambulatory-plane frame first according to sizes of the upper cover plate 1 and the lower cover plate 4; then place the hot melt film of the rectangular-ambulatory-plane frame around an overlapping area between the upper cover plate 1 and the lower cover plate 4; place the elongated hot melt film and a liquid injection tube near a tail portion of either of the dot matrix array structure a 2 and the dot matrix array structure b 3; and then seal the overlapping area of the upper cover plate 1 and the lower cover plate 4 by heating and pressurizing, without need to hot-melt and hot-press the elongated hot melt film at a tail portion of the liquid injection tube for sealing.

The hot melt film is heated to 150° C.-270° C. through the hot press for melting, then pressurized and press-fitted, and finally cooled to below 50° C. for bonding.

In some examples of the present disclosure, the hot melt film includes but is not limited to a polyimide (PI) film, and a thickness of the hot melt film is 0.05-1 mm.

Further, the hot melt film of the rectangular-ambulatory-plane frame is placed around the upper cover plate 1 and the lower cover plate 4, with a placement width of 0.5 mm; and the elongated hot melt film is placed at the tail portion of either of the dot matrix array structure a 2 and the dot matrix array structure b 3, with a placement width of 0.5 mm. The elongated hot melt film facilitates sealing of the cavity 5 between the upper cover plate 1 and the lower cover plate 4 before the liquid injection tube is cut off after the liquid injection and degassing.

5) Degas and Inject Liquid for the Upper Cover Plate and the Lower Cover Plates after the Sealing for the First Time.

In an example of the present disclosure, the degassing and injecting liquid for the liquid injection tube.

Further, the degassing and liquid injection are performed by using a specially customized liquid injection and degassing device for the ultra-thin flexible vapor chamber.

The specially customized liquid injection and degassing device is capable of achieving precise micro-amount liquid injection and degassing of the ultra-thin vapor chamber for a plurality of times.

6) Seal the Upper Cover Plate and the Lower Cover Plate for a Second Time to Obtain the Ultra-Thin Flexible Vapor Chamber.

In an example of the present disclosure, after the liquid injection and degassing and before cutting off the liquid injection tube, the rectangular hot melt film placed near the tail portion of either of the dot matrix array structure a 2 and the dot matrix array structure b 3 is sealed by heating and pressurizing same with a heat sealer.

Figure 8:
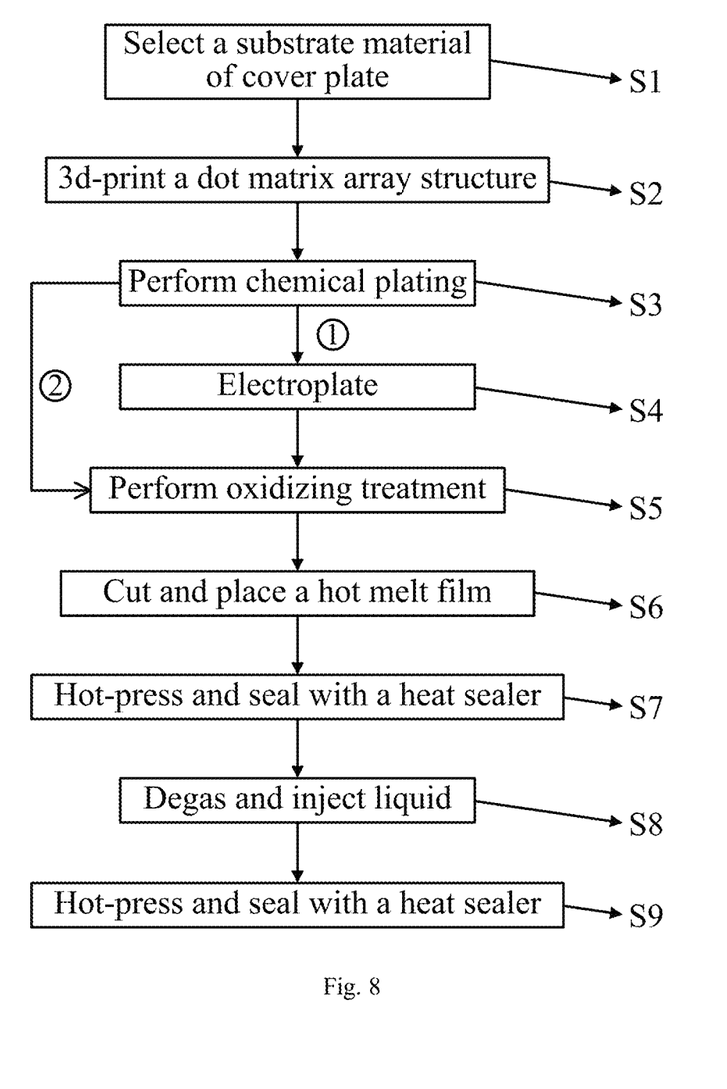
FIG. 8 is a flowchart of a preparation method for an ultra-thin flexible vapor chamber of the present disclosure.

In the present disclosure, as illustrated in FIG. 8, the preparation method for an ultra-thin flexible vapor chamber specifically includes the following steps:

S1: selecting a substrate material with excellent flexibility and thermal conductivity for both the upper cover plate and the lower cover plate.

The upper cover plate 1 and the lower cover plate 4 can be made of the flexible printed circuit board, the copper foil, the graphene-coated copper plate, the graphene, or the copper-polyimide composite material, or the like, with a thickness of 0.03 mm-1 mm respectively.

S2: printing the dot matrix array structure a 2 and the dot matrix array structure b 3 on the lower cover plate 4 through an ultra-high-precision photocurable PµSL device.

The dot matrix array structure a 2 and the dot matrix array structure b 3 are coplanar integrated structures, the cavity 5 of the vapor chamber formed is a gas-liquid coplanar cavity, the dot matrix array structure a 2 and the dot matrix array structure b 3 are formed by structural unit arrays, and the dot matrix array structure a 2 and the dot matrix array structure b 3 are obtained by arraying different numbers of structural units with a size of 400-500 µm (length)*400-500 µm (width)*100-140 µm (height).

First design a three-dimensional model diagram of the desired dot matrix array structure a 2 and the dot matrix array structure b 3, slice the three-dimensional model diagram layer by layer through slicing software, extract contours generated by each layer of slicing, design a reasonable scanning path, and then convert same into a corresponding digital control program and import same into a photocurable PµSL device with a precision of 2-10 µm.

Then prepare the resin material for the dot matrix array structure a 2 and the dot matrix array structure b 3, load same into the photocurable PµSL device, select various model parameters of the printed dot matrix array structure a 2 and the dot matrix array structure b 3 through control software, and adjust a temperature and printing speed of the PµSL device.

Then, start printing, print the dot matrix array structure a 2 and the dot matrix array structure b 3 layer by layer on the lower cover plate 4 according to the scanning path, irradiate the materials of the dot matrix array structure a 2 and the dot matrix array structure b 3 to be printed layer by layer through light beams, solidify the liquid material layer by layer until the dot matrix array structure a 2 and the dot matrix array structure b 3 are fully printed, and remove the lower cover plate 4 together with the dot matrix array structure a 2 and the dot matrix array structure b 3 from the photocurable PµSL device.

S3: performing the chemical plating on the dot matrix array structure.

S301: performing the water soaking treatment.

S302: degreasing with a degreasing agent for 1 min-5 min, and then rinsing with water for 2-3 times.

S303: performing the roughening at 55° C.-75° C. for 1 min-5 min in a strong oxidizing agent, and then rinsing with water for 2-3 times.

S304: keeping in an acidic sensitizing solution for 2-5 min with slow shaking, and then rinsing with water for 2-3 times.

S305: soaking in an activating solution for 1.5-2.5 min at room temperature, and then rinsing with water for 2-3 times.

S306: magnetically stirring at a speed of 900-1100 r/min for 30 min-45 min in a chemical copper plating solution AB, and then rinsing with water for 2-3 times.

S4: performing the electroplating on the chemically plated dot matrix array structure.

Performing the electroplating treatment in a low-stress acidic electroplating solution by using the pulsed power supply.

S5: performing the oxidizing treatment on the metallized dot matrix array structure.

Soak in hydrogen peroxide with a concentration of 20 wt %-30 wt % for 20 min-30 min.

S6: cutting the hot melt film into a rectangular-ambulatory-plane frame, and placing the hot melt film of the rectangular-ambulatory-plane frame around an overlapping area between the upper cover plate and the lower cover plate, and placing the elongated hot melt film and a liquid injection tube near a tail portion of the dot matrix array structure.

The hot melt film is made of polyimide, and a thickness of the polyimide hot melt film is 0.05-1 mm.

S7: sealing the overlapping area of the upper cover plate and the lower cover plate by heating and pressurizing.

The polyimide hot melt film is heated to 150° C.-270° C. through the hot press for melting, then pressurized and press-fitted, and finally cooled to below 50° C. for bonding.

S8: degasing and inject liquid for the upper cover plate and the lower cover plate after the sealing.

Perform the degassing and liquid injection by using the liquid injection and degassing device for the ultra-thin flexible vapor chamber, and also the liquid injection tube.

S9: sealing the elongated hot melt film placed near the tail portion of the dot matrix array structure, using a heat sealer, by heating and pressurizing.

After the liquid injection and degassing and before cutting off the liquid injection tube, the rectangular hot melt film placed near the tail portion of the dot matrix array structure is sealed by heating and pressurizing same with the heat sealer.

In a second aspect, the present disclosure provides an ultra-thin flexible vapor chamber, and the ultra-thin flexible vapor chamber is prepared by using the preparation method provided in the first aspect of the present disclosure.

In a third aspect, the present disclosure provides an application of the ultra-thin flexible vapor chamber in heat dissipation of an electronic device. The ultra-thin flexible vapor chamber prepared by the preparation method provided in the first aspect of the present disclosure or the ultra-thin flexible vapor chamber provided in the second aspect of the present disclosure is adopted.

The preparation method for the ultra-thin flexible vapor chamber of the present disclosure will be further described below in conjunction with specific examples.

Embodiment 1

S1: Selecting an Ultra-Thin Flexible Substrate Material.

The ultra-thin flexible substrate material is used to prepare the upper cover plate and the lower cover plate of the ultra-thin flexible vapor chamber, with a thickness of 0.03-1 mm. The substrate material of the ultra-thin flexible vapor chamber includes but is not limited to the FPCB, the thin copper foil, the graphene-coated copper, the graphene, the metal-polymer composite material, or the like. The upper cover plate and the lower cover plate can be made of a same material or different materials.

S2: Performing the PμSL.

The dot matrix array structure is obtained by integrated PμSL on the lower cover plate through the micro-scale PμSL technology, a height of the dot matrix array structure is consistent, the cavity of the vapor chamber formed is a gas-liquid coplanar cavity, and the dot matrix array structure is obtained by arraying different numbers of structural units with a size of 500 μm (length)*500 μm (width)*140 μm (height). The PμSL technology achieves a precision of 5 μm, and has significant advantages in high-precision printing.

S3: Performing the chemical plating.

The dot matrix array structure of the array structure is obtained by using the PμSL technology. The dot matrix array structure is not hydrophilic because surface energy thereof is less than that of water, and therefore a series of surface treatments such as chemical reduction and chemical copper plating are needed to change the surface energy of the dot matrix array structure obtained through the PμSL in the lower cover plate. The chemical plating includes the steps of water soaking, degreasing, rinsing, roughening, rinsing, sensitizing, rinsing, activating, rinsing, chemical plating, and rinsing.

During the water soaking, dust and other impurities on the surface of the lower cover plate are removed.

A degreasing agent is prepared in a ratio of 5:3:2 ($Na_3PO_4$: $Na_2CO_3$: NaOH), the degreasing is performed at room temperature for 1 min-5 min, and full rinsing with water is performed for 2-3 times to remove the residual degreasing agent on a surface thereof.

The roughening is chemical roughening, which aims to oxidize and erode the surface of the dot matrix array structure through use of a strong oxidizing agent to make same rougher. In this way, the roughness of a surface of a resin structure can be enhanced, thereby enhancing bonding with plated metal. In this process, chromic acid is used as a strong oxidizing agent, with a roughening temperature of 55° C.-75° C., and roughening time of 1 min-5 min. After the roughening, full rinsing with water is further required for 2-3 times to remove residual roughening liquid on the surface thereof.

The sensitizing treatment refers to a process of making a layer of reducible $Sn^{2+}$ attached to the surface of the roughened lower cover plate, by soaking the lower cover plate in an acidic sensitizing solution at room temperature for 2-5 min with slow shaking, and then performing full rinsing with water for 2-3 times to remove residual sensitizing agent on the surface thereof.

The activating treatment aims to convert $Ag^+$ in an activating solution into metallic silver particles through a reducing action of $Sn^{2+}$, and the metallic silver particles are firmly attached to the surface of the resin structure to form a uniform catalytic crystallization center, which provides basic conditions for the spontaneous chemical plating. This process is executed at room temperature, and after soaking for 2 min, thorough rinsing with water is performed to remove the residual activating solution on the surface thereof.

A chemical copper plating solution AB commonly used in industries is used for the chemical plating, where a chemical plating solution A is a mixture of copper sulfate and formaldehyde, and a chemical plating solution B is an alkaline complexing agent. In a water bath, the chemical copper plating solution is prepared by mixing the chemical plating solution A, the chemical plating solution B and deionized water in a ratio of 1:2:3 at 32° C.-45° C. Then, the lower cover plate is placed in the prepared chemical plating solution, magnetically stirred at a speed of 1000 r/min for 30 min-45 min, and then fully rinsed to remove the residual chemical plating solution.

S4: Performing the Electroplating.

The lower cover plate is electroplated after the chemical plating, a low-stress acidic electroplating solution is used, and a pulsed power supply is used for the electroplating. Pulsed electroplating enables to obtain a plating layer with a denser structure, a small grain size and better uniformity, thereby improving corrosion resistance, wear resistance, conductivity and other properties of the plating layer. Moreover, necessity of electroplating optimization depends on requirements for material metallization.

S5: Performing the Oxidizing Treatment.

The oxidizing treatment of the lower cover plate based on the PμSL is performed to oxidize metallized copper into copper peroxide and copper oxide, so as to enhance hydrophilicity of the dot matrix array structure. The oxidizing treatment refers to a process of soaking an object in a 20-30 wt % $H_2O_2$ solution for 20 min-30 min, then taking same out for full rinsing with water, and finally drying with a hair dryer.

S6: Placing the Hot Melt Film; and

S7: Performing Encapsulation.

The encapsulation refers to encapsulation of the lower cover plate and the upper cover plate after the chemical plating, the electroplating and the oxidizing treatment. For the encapsulation, the hot melt film is heated to 150° C.-270° C. through the hot press for melting, then pressurized and press-fitted, and finally cooled to below 50° C. for bonding. The hot melt film includes but is not limited to a polyimide hot melt film, a thickness of the polyimide hot melt film is 0.05 mm-1 mm, and the polyimide hot melt film needs to be placed on four sides of an area between the upper cover plate and the lower cover plate to be sealed, as well as a tail portion of the liquid injection tube. First, the four sides of the area between the upper cover plate and the lower cover plate are hot-melt and hot-pressed for sealing, and the liquid injection tube is sealed in an integrated manner, without need to hot-melt and hot-press the hot melt film at the tail portion of the liquid injection tube for sealing.

S8: Performing the Degassing and Liquid Injection.

A composite plate of the upper cover plate and the lower cover plate that is fully sealed on all sides is subjected to the degassing and liquid injection, and an injected working substance includes but is not limited to deionized water.

S9: Performing the Encapsulation.

The polyimide hot melt film at the tail portion of the liquid injection tube in the above composite plate is hot-melted and hot-pressed for sealing after the degassing and liquid injection, and then the liquid injection tube is cut off to form a piece of the ultra-thin flexible vapor chamber.

The foregoing descriptions are merely preferred specific embodiments of the present disclosure, and are not intended to limit the protection scope of the present disclosure. Any equivalent substitutions or changes made by a person skilled in the art easily within the technical scope disclosed in the present disclosure shall fall within the protection scope of the present disclosure. Therefore, the protection scope of the present disclosure should be subject to a protection scope of the claims.

EXPLANATION OF REFERENCE NUMERALS 1. upper cover plate; 2. dot matrix array structure a; 3. dot matrix array structure b; 4. lower cover plate; and 5. cavity.

What is claimed is:

1. A preparation method for an ultra-thin flexible vapor chamber, comprising:
    preparing a lower cover and an upper cover;
    printing a dot matrix array structure on one side of the lower cover plate using a projection micro stereolithography (PμSL) device, wherein a precision of the PμSL device is 2-10 μm, the dot matrix array structure is obtained by arraying different numbers of structural units with a length size of 400-500 μm, a width size of 400-500 μm, and a height size of 100-140 μm, the dot matrix array structure comprises at least one of a parallel array structure, a star-shaped array structure, and a radial array structure, and the dot matrix array structure is configured to absorb and transport liquid and support the upper cover plate and the lower cover plate;
    performing surface treatment on the dot matrix array structure, wherein performing the surface treatment on the dot matrix array structure comprises chemical plating and oxidizing treatment in sequence, or performing the surface treatment on the dot matrix array structure comprises chemical plating, electroplating and oxidizing treatment in sequence, the oxidizing treatment is performed by using hydrogen peroxide, and a concentration of the hydrogen peroxide is 20 wt %-30 wt %;
    sealing the upper cover plate for a first time on the one side of the lower cover plate with the dot matrix array structure, wherein the sealing for the first time comprises: cutting a hot melt film into a rectangular-ambulatory-plane frame; placing the hot melt film of the rectangular-ambulatory-plane frame on a periphery of an overlapping area between the upper cover plate and the lower cover plate; placing an elongated hot melt film and a liquid injection tube near a tail portion of the dot matrix array structure; and sealing the periphery of the overlapping area between the upper cover plate and the lower cover plate by heating and pressurizing, wherein the hot melt film is made of polyimide hot melt film;
    degassing and injecting liquid using the liquid injection tube after the sealing for the first time; and
    sealing the upper cover plate and the lower cover plate for a second time to obtain the ultra-thin flexible vapor chamber.

2. The preparation method for an ultra-thin flexible vapor chamber according to claim 1, wherein degassing and injecting liquid for the liquid injection tube.

3. The preparation method for an ultra-thin flexible vapor chamber according to claim 2, wherein the sealing for the second time comprises:
    sealing the hot melt film placed near the tail portion of the dot matrix array structure, using a heat sealer, by heating and pressurizing.

4. The preparation method for an ultra-thin flexible vapor chamber according to claim 1, wherein the upper cover plate and the lower cover plate independently use one of a flexible printed circuit board, a copper foil, a graphene-coated copper plate, graphene, and a metal-polymer composite material.

* * * * *